United States Patent
Helbok et al.

(10) Patent No.: US 9,619,788 B2
(45) Date of Patent: Apr. 11, 2017

(54) METHOD FOR AUTOMATICALLY ALLOCATING TASKS TO USERS WITHIN A WORKFLOW MANAGEMENT SYSTEM

(71) Applicants: Günther Helbok, Vienna (AT); Babak Houman, Vienna (AT)

(72) Inventors: Günther Helbok, Vienna (AT); Babak Houman, Vienna (AT)

(*) Notice: Subject to any disclaimer, the term of this patent is extended or adjusted under 35 U.S.C. 154(b) by 306 days.

(21) Appl. No.: 14/019,848

(22) Filed: Sep. 6, 2013

(65) Prior Publication Data

US 2014/0095242 A1    Apr. 3, 2014

(30) Foreign Application Priority Data

Sep. 6, 2012 (AT) .................................. A 978/2012

(51) Int. Cl.
*G06Q 10/10* (2012.01)
*G06Q 10/06* (2012.01)

(52) U.S. Cl.
CPC ..... *G06Q 10/1097* (2013.01); *G06Q 10/0633* (2013.01); *G06Q 10/06316* (2013.01)

(58) Field of Classification Search
CPC .... G06Q 10/00; G06Q 40/00; G06Q 10/1097; G06Q 10/0631; G06Q 10/0633; G06F 17/60
USPC ....................................................... 705/7.21
See application file for complete search history.

(56) References Cited

U.S. PATENT DOCUMENTS

| | | | | |
|---|---|---|---|---|
| 6,430,538 B1* | 8/2002 | Bacon | ........... | G06Q 10/06316 705/7.21 |
| 6,574,605 B1* | 6/2003 | Sanders | ........... | G06Q 10/06316 705/7.26 |
| 6,697,784 B2* | 2/2004 | Bacon | ........... | G06Q 10/06316 705/7.26 |
| 7,346,532 B2* | 3/2008 | Kusama | ........... | G06Q 10/06 705/7.15 |
| 7,729,935 B2* | 6/2010 | Theiler | ........... | G06Q 10/06311 705/7.27 |
| 8,880,418 B2* | 11/2014 | Nonaka | ........... | G06Q 10/06311 705/7.13 |
| 2002/0007300 A1* | 1/2002 | Slatter | ........... | G06Q 10/06311 705/7.13 |

(Continued)

*Primary Examiner* — Romain Jeanty
(74) *Attorney, Agent, or Firm* — Lowenstein Sandler LLP

(57) ABSTRACT

A computer-assisted method for automatically assigning work tasks in a workflow management system includes providing at least one first directed graph and at least one second directed graph assigning, with respect to a user, an authorization category to at least one object in the first graph and to at least one object in the second graph in order to respectively obtain at least one assigned object forming the Cartesian product of the first and the second graph to obtain a product graph, identifying the product object of the product graph resulting from the assigned object of the first graph and the assigned object of the second graph and identifying sub-objects of the product object, to which the second authorization category also applies, if applicable, assigning the user to the identified product object and the identified sub-objects of the product graph, obtaining a responsibility request with respect to a requested object of the product graph, determining the user assigned to the requested object, and assigning the request to the user.

8 Claims, 6 Drawing Sheets

(56) References Cited

U.S. PATENT DOCUMENTS

| | | | |
|---|---|---|---|
| 2004/0019512 A1* | 1/2004 | Nonaka | G06Q 10/06311 705/7.26 |
| 2005/0149375 A1* | 7/2005 | Wefers | G06Q 10/06 705/7.13 |
| 2007/0203778 A1* | 8/2007 | Lowson | G06Q 10/06 705/7.14 |
| 2011/0145037 A1* | 6/2011 | Domashchenko | G06Q 10/06 705/7.27 |
| 2012/0053978 A1* | 3/2012 | Andersen | G06Q 10/06 705/7.14 |

* cited by examiner

METHOD FOR AUTOMATICALLY ALLOCATING TASKS TO USERS WITHIN A WORKFLOW MANAGEMENT SYSTEM

CROSS-REFERENCE TO RELATED APPLICATIONS

This U.S. application claims priority from Austrian Patent Application A 978/2012, filed Sep. 6, 2012, the complete disclosure of which are hereby incorporated herein by reference in their entirety for all purposes.

The invention relates to a computer-assisted method for automatically assigning work tasks to users in a workflow management system.

The invention also relates to a data processing program that is executed in a data processing system and comprises software code elements for carrying out the inventive method. The invention furthermore relates to a computer program product that is stored on a computer-compatible medium and contains computer-readable program means in order to prompt the computer to carry out the inventive method.

Modern workflow management systems are an indispensable part of business management in many companies. In this case, a workflow is a process that is composed of individual activities that refer (for example) to product hierarchies, parts of a business process and/or other organizational procedures. Software systems are typically utilized for managing workflows. These systems not only allow the definition, but also the execution of the workflows in that they control the workflow instances in accordance with a predefined model mapped in the computer and make available or retrieve the data and applications required for this purpose. The function of a workflow management system consists of coordinating who (roles) processes what (task) when (process) and how (environment).

A role comprises tasks, the access authorizations of which are based on identical categorization areas.

In most instances, a map of the company structures, product catalogues and similar categorization models forms the basis of workflow management systems. However, these structures are by no means static, but rather change in all dimensions over the course of time. Changes in the aforementioned models frequently lead to an enormous effort for the continuously required adaptation of the business processes that are based on these models.

In sufficiently large companies, the determination of the responsibility of a person/department for an incoming request composed of several attributes is an elaborate, complex and maintenance-intensive process that also needs to be modelled and managed.

DETAILED DESCRIPTION

Figure 1:
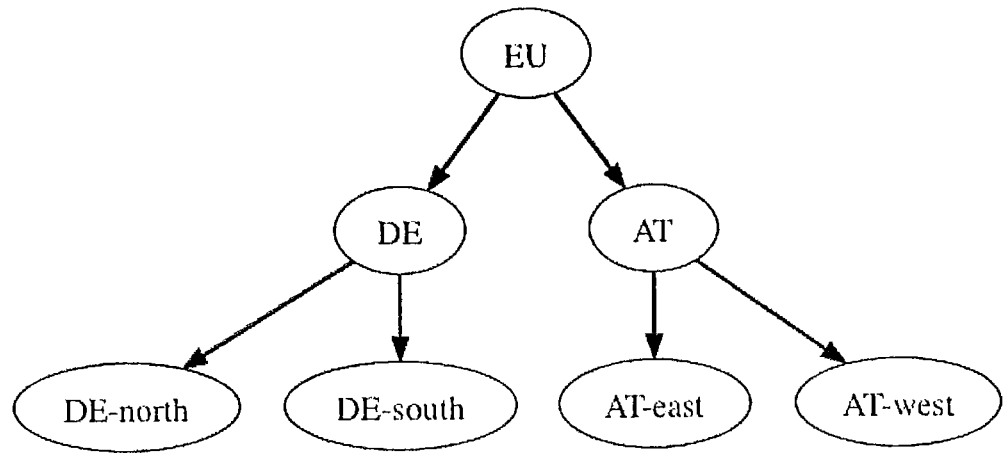
FIG. 1 is a graph representative of a hierarchy of geographic branch offices of a company in an exemplary embodiment.

The present invention therefore aims to improve a computer-assisted workflow management in such a way that work tasks are automatically assigned to a responsible person or department. On the one hand, the invention should reduce the complexity and the maintenance effort of a responsibility catalogue for the users when the initial entry takes place and when incidental updates are triggered during the running process operation, for example, by changes of the process structures and/or organizational hierarchies. On the other hand, the success of the search for a responsible person or department should respectively always be ensured on presentation of a completed request or immediately after restructuring processes.

In order to attain these objectives, the invention proposes a method with the following steps:

providing at least one first directed graph and at least one second directed graph that respectively comprise objects and connections between these objects, wherein objects, the connections of which originate directly or indirectly from a parent object, form subobjects of this object, providing at least two different authorization categories, wherein a first authorization category represents a local authorization that is limited to the respective object and a second authorization category represents an authorization that applies to the respective object and at least part of the subobjects of this object, assigning, with respect to a user, an authorization category to at least one object in the first graph and to at least one object in the second graph in order to respectively obtain at least one assigned object, forming the Cartesian product of the first and the second graph in order to obtain a product graph, identifying the product object of the product graph resulting from the assigned object of the first graph and the assigned object of the second graph and identifying subobjects of the product object, to which the second authorization category also applies, if applicable, assigning the user to the identified product object and the identified subobjects of the product graph, obtaining a responsibility request with respect to a requested object of the product graph, determining the user assigned to the requested object, and assigning the request to the user.

Due to the fact that at least one first directed graph and at least one second directed graph are provided, all responsibilities of a user can be defined separately of one another in each categorization area of the company. A graph preferably represents the respective categorization area of the company in the form of a hierarchic structure, i.e. in the form of a tree structure, in which several levels of objects are provided. For example, geographic areas and the product catalogue of the company and/or legal entities/branch offices and/or organizational hierarchy/business segments/divisions and/or process catalogues of the company may be considered as categorization areas. In this way, it is possible to map multidimensional organizational structures, in which organizational subareas are formed on a hierarchy level due to the parallel utilization of different criteria in the delimitation of competence (product, legal entity, division, etc.), in terms of authorization technology. Due to the utilization of the present invention, the disadvantage of greater demands on the coordination of the delimitation of competence in multidimensional organizational structures can be significantly reduced.

Another advantage of the invention is the reduced effort for managing the task areas assigned to the users.

Another advantage of the invention can be seen in that changes in the categorization areas automatically appear as changes in the responsibility areas.

Another advantage of the invention is the certainty that incoming requests are processed if delegable task areas are assigned to an individual user.

In this case, the responsibilities are defined by allocating authorizations to certain objects. According to the invention, it is proposed that there is a plurality of authorization categories. A first, local authorization category defines a task area of the respective person that refers to only a single object. In the second, global or delegable authorization category, in contrast, the task area consists of the assigned object along with a subtree or rather at least part of the subobjects of the assigned object. In this case, it is preferred that the second authorization category represents an authorization that applies to the respective object and all subobjects of this object.

Once the Cartesian product of the first and the second graph is formed in accordance with the invention in order to obtain a product graph, the responsibility for the corresponding work task can be easily determined based on an object requested during the course of a responsibility request. For this purpose, it suffices to determine the task area by tracking the connections resulting from the respective authorization categories. In comparison with much more complicated procedures used so far, it is no longer required to individually calculate all combinations such that the computing effort is reduced on the one hand and the flexibility and adaptability of the overall system are significantly improved on the other hand. When the authorization category of a person changes, for example, it is no longer necessary to newly calculate all combinations, but the changed authorization merely needs to be newly taken into consideration in the product graph when tracking the individual connections. This also applies to instances, in which an authorization or responsibility of a person with respect to one or more objects is replaced with the authorization or responsibility of another person. In such an instance, it is not necessary to newly calculate the entire system, but the changed authorization merely needs to be passed on from the respective graph to the product graph such that an updated overall system is available as fast as possible and without significant effort.

The advantages of the invention manifest themselves, in particular, in large companies with confusing, complex and multidimensional organizational structures. The inventive method particularly can be scaled almost arbitrarily without disproportionally increasing the computing effort. Within the scope of the invention, it preferably is not only possible to take into consideration two graphs, but readily also more graphs, particularly at least one additional graph that comprises objects and connections between these objects and to the objects of which authorizations can be assigned separately. The at least one additional graph is taken into consideration in the formation of the Cartesian product and the determination of the responsible person is carried out based on a requested product object of the product graph as described above in connection with a product graph that is formed of two graphs.

During the identification of subobjects that form part of the task area of a person, it is necessary to track the connections to subobjects that correspond to the authorization category of the person in the respective graph as already mentioned above. For this purpose, it needs to be determined which authorization category was assigned in which of the two original graphs. In this case, the tracking of connections in order to identify subobjects only needs to be carried out if a second authorization category was assigned that also applies to at least part of the subobjects of an object. If the second authorization category also applies to all subobjects of the respective object, the identification of the subobjects of the product graph, to which the task area also applies, is preferably carried out in such a way that the product graph features connections between objects that correspond to the structure of the first graph and connections that correspond to the structure of the second graph, and that the identification of subobjects of the product object comprises:

the selection of connections that originate directly and/or indirectly from the product object and have the structure of the first graph if the second authorization category is assigned to the assigned object of the first graph, the selection of connections that originate directly and/or indirectly from the product object and have the structure of the second graph if the second authorization category is assigned to the assigned object of the second graph, the tracking of the selected connections, wherein all subobjects are identified that can be reached from the product object along the selected connections.

However, when providing a third authorization category that represents an authorization applying to the respective object and those subobjects of this object, to which no authorization of the first or second authorization category of another user is assigned, the identification of subobjects of the product graph comprises:

the selection of connections that originate directly and/or indirectly from the product object and have the structure of the first graph if the third authorization category is assigned to the assigned object of the first graph, the selection of connections that originate directly or indirectly from the product object and have the structure of the second graph if the third authorization category is assigned to the assigned object of the second graph, the tracking of the selected connections, wherein all subobjects are identified that can be reached from the product object along the selected connections and to which no authorization of the first or second authorization category of another user is assigned.

The invention is described in greater detail below with reference to the following exemplary embodiments. The terms used therein are defined beforehand as follows.

Graph:

A graph is a set consisting of points that are connected with lines. The points are referred to as nodes $k_i$ and the lines are referred to as edges $e_j$. The nodes are in the context of the invention also referred to as objects. The edges are in the context of the invention also referred to as connections.

Directed Graph:

A directed graph is a graph, the edges $e_j$ of which have a direction.

Cartesian Product of Graphs:

It is assumed that G and H are two graphs. Their node sets are described with $G_k=\{g_i\}$ and $H_k=\{h_j\}$. The node set of the product graph is the Cartesian product of the two basic graphs:

Node set of the product graph:

$$G \times H = \{(g_i, h_j) | g_i \in G \wedge h_j \in H\}$$

Edges:

Two nodes of the product graph $(g_i, h_j)$ and $(g'_i, h'_j)$ are connected if and only if $$g_i = g'_i \wedge h_j \xrightarrow{H} h'_j \quad \text{or} \quad g_i \xrightarrow{G} g'_i \wedge h_j = h'_j,$$

wherein the symbol $$x \xrightarrow{F} y$$

represents the existence of an edge between two nodes x and y in the graph F.

Figure 2:
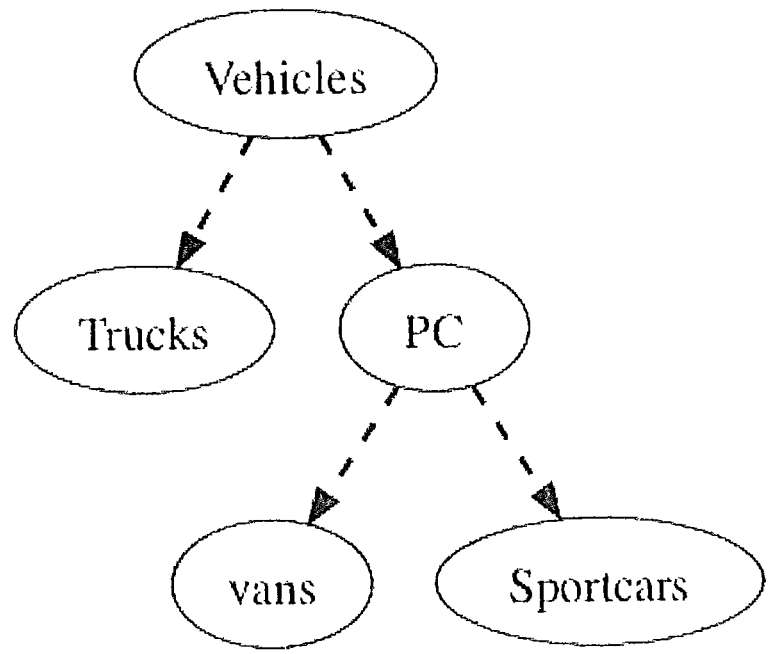
FIG. 2 is a graph representative of a hierarchy of product categories of a company in an exemplary embodiment.

In a first exemplary embodiment, the graph G represents the hierarchy of the geographic branch offices of a company (see FIG. 1). In this case, "EU" stands for the European Union, "DE" stands for Germany and "AT" stands for Austria. In addition, the graph H hierarchically represents the product categories of this company (see FIG. 2). In this specific instance, this concerns vehicles that are divided into passenger cars (PC) and trucks (Trucks). The passenger cars comprise the subgroups vans and sportcars. The connections (edges) between the individual nodes are drawn with continuous lines in the graph H and with broken lines in the graph G in order to better distinguish these connections.

The node (the object), in which a user should be authorized, i.e. for which the user should be responsible, is respectively determined in each of the original graphs G and H. The corresponding nodes are described with $g_0 \in G$ and $h_0 \in H$. The authorization is allocated by assigning one of the following rights allocation categories to each of the selected nodes. The authorization category can preferably be selected from the categories global, local and delegable. The semantic meaning of these categories is defined as follows:

local: the task area consists solely of the assigned node
global: the task area consists of the entire subtree of the assigned node, i.e. of the assigned node and all subobjects of this node
delegable: the task area consists of the assigned node and all subobjects of this node except in those nodes (as well as the nodes lying thereunder), in which the same right was assigned to another user.

The task area of the user is basically determined based on the node that was explicitly assigned to the user as follows:

1. If the authorization in the graph belongs to the authorization category type "local", no additional nodes that are connected to the explicitly assigned node are added to the task area of the user.
2. If the authorization in the graph belongs to the authorization category type "global", all nodes that are connected to the explicitly assigned node are added to the task area of the user.
3. If the authorization in the graph belongs to the authorization category type "delegable", all nodes that are connected to the explicitly assigned node are assigned to the task area of the user except nodes that are already assigned to another user.

This procedure is likewise chosen for the additional graph or the additional graphs and can also be applied to n-fold Cartesian products of n different graphs.

Figure 3:
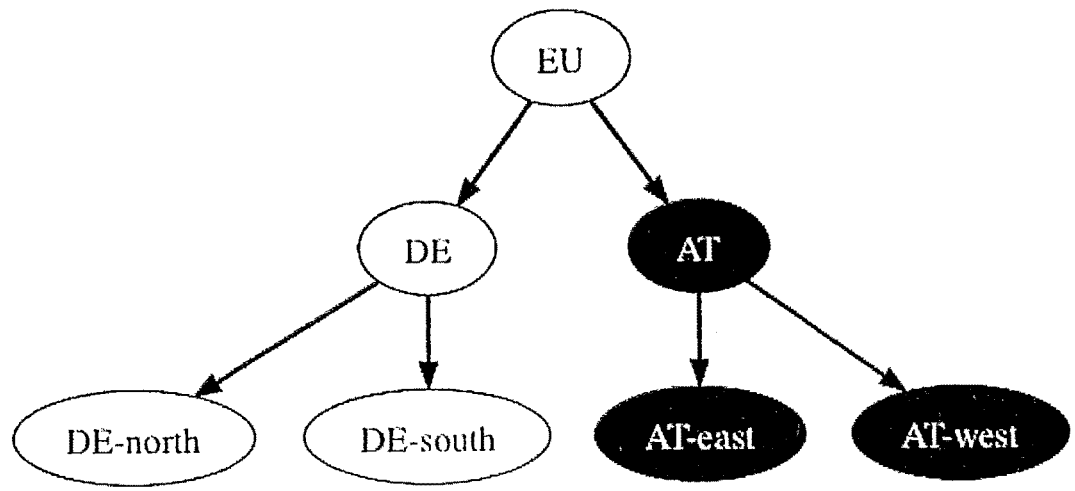
FIGS. 3 and 4 are graphs representative of node authorizations, respectively, in the hierarchies of geographic branch offices and product categories of the company in an exemplary embodiment.
Figure 4:
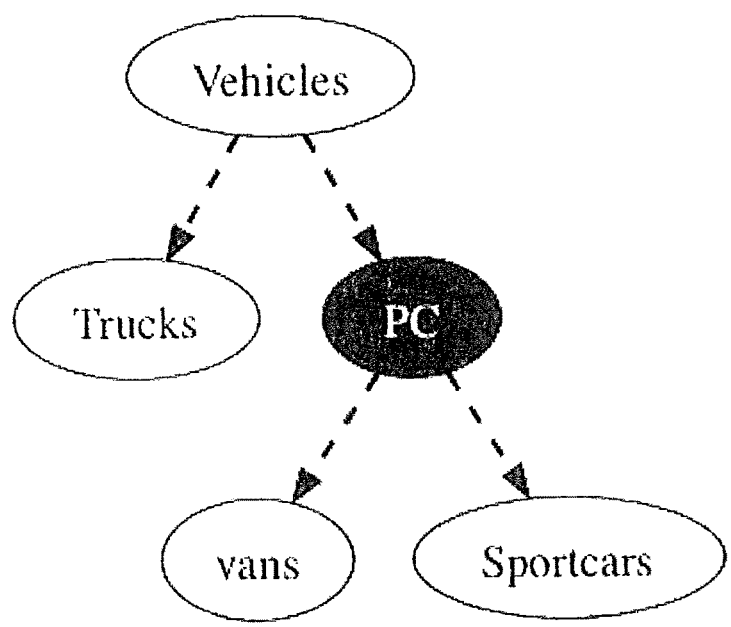

In the present first exemplary embodiment, the task area of an employee is defined by $(AT_{global}, PC_{local})$. In the graph G, this employee therefore is responsible for the node "AT" and all subobjects lying thereunder, namely "AT-East" and "AT-West", i.e. for all of Austria. In the graph H, this employee is only responsible for the node "PC", i.e. the employee is responsible for all PCs except vans and sportcars. The nodes, to which the authorization is assigned, and the nodes, to which this authorization also applies due to the authorization category, are illustrated with a dark background in FIGS. 3 and 4.

Figure 5:
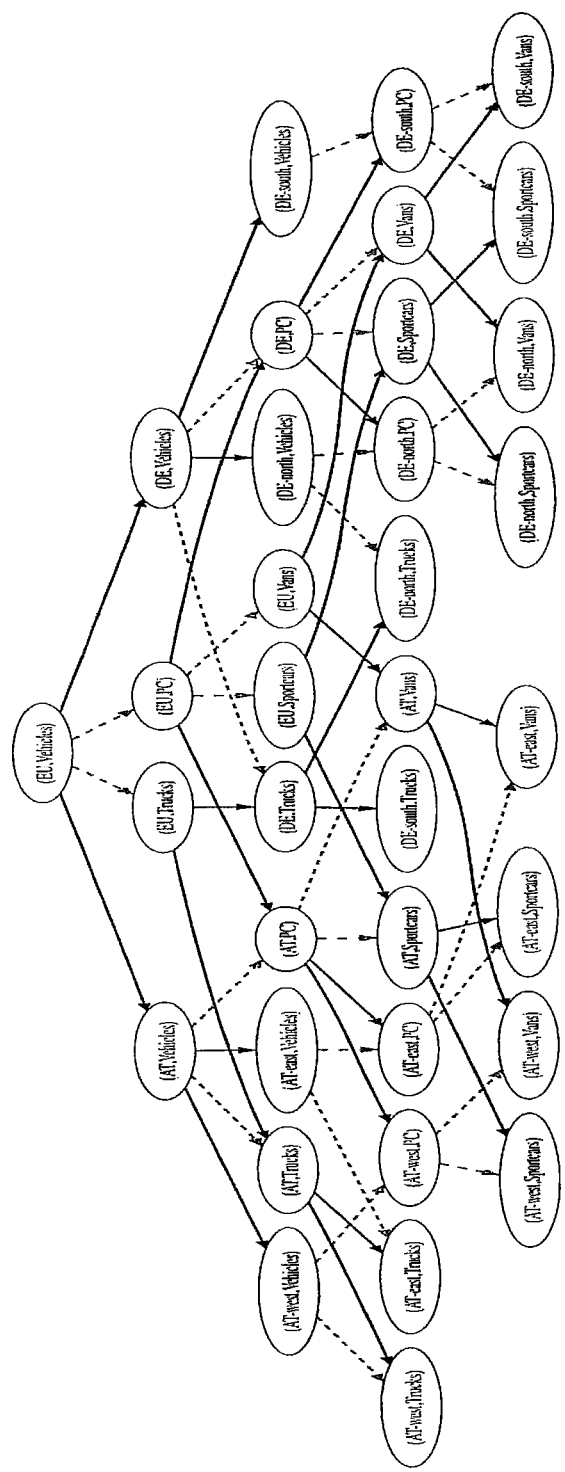
FIG. 5 is a graph representative of a Cartesian product of the graphs representative of the hierarchies of geographic branch offices and product categories of the company in an exemplary embodiment.

FIG. 5 shows the Cartesian product G×H of the two graphs G and H. In this case, the product graph features connections between objects that correspond to the structure of the first graph and therefore are drawn with continuous lines, as well as connections that correspond to the structure of the second graph and therefore are drawn with broken lines. In this product graph, the node $(g_0, h_0)$ resulting from the node $g_0$ of the first graph and the node $h_0$ of the second graph is initially identified. This node is (AT, PC) and illustrated with a bold border in FIG. 5. Based on this node $(g_0, h_0)$ in the product graph and the respective assignment categories $(kg_0, kh_0)$, the task area can now be determined with the aid of the respective edges without having to individually calculate all combinations. Since the assignment in the graph G (FIG. 3) is global, all nodes of the product graph that can be reached from (AT, PC) along edges drawn with continuous lines need to be assigned to the task area. The assignment category in the graph H (FIG. 4), however, is local and edges that originate at (AT, PC) and are drawn with broken lines therefore cannot be tracked further. In this case, the task area that is identified by a bold border consists of the node set B={
(AT,PC),
(AT-East, PC)
(AT-West,PC)}

This description requires no exact listing of each node, for which the user has the authorization.

Figure 6:
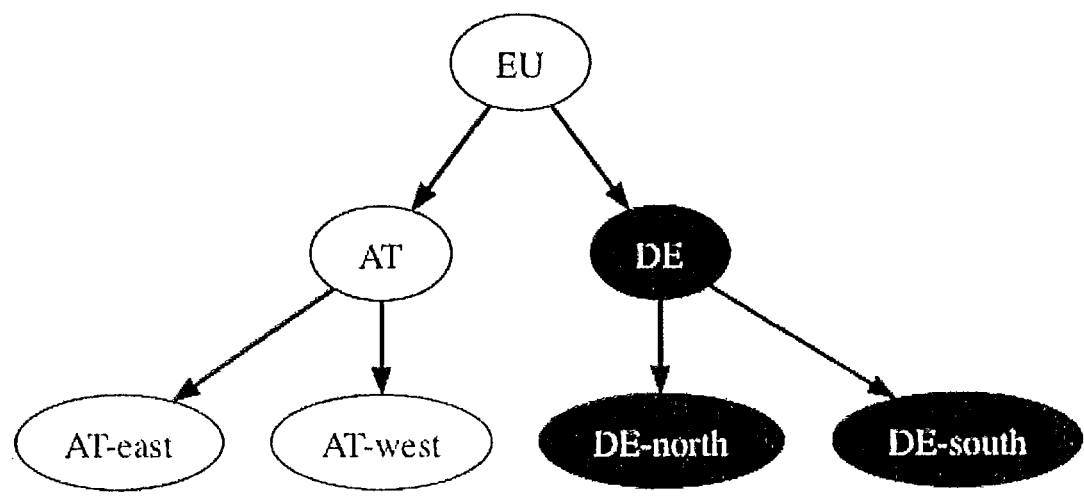
FIGS. 6 and 7 are graphs representative of task areas of an employee in an exemplary embodiment.
Figure 7:
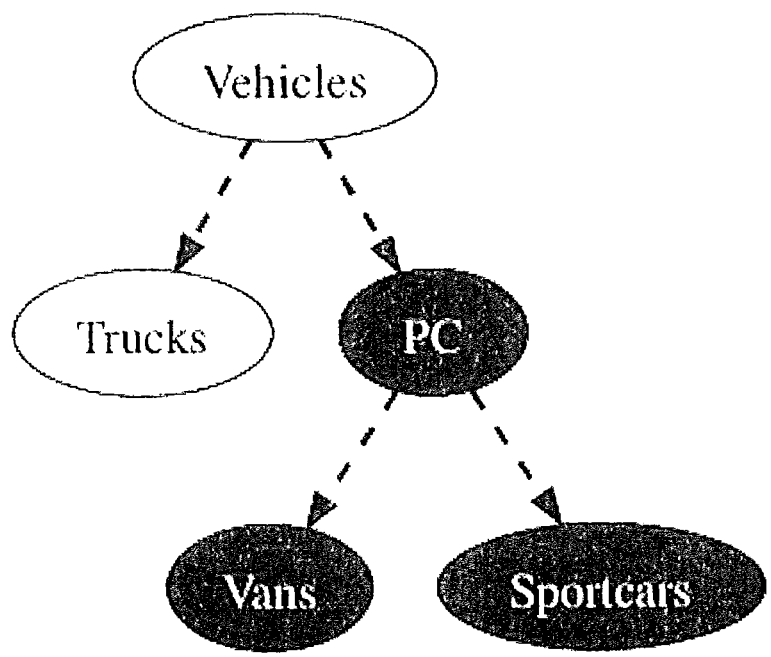
Figure 8:
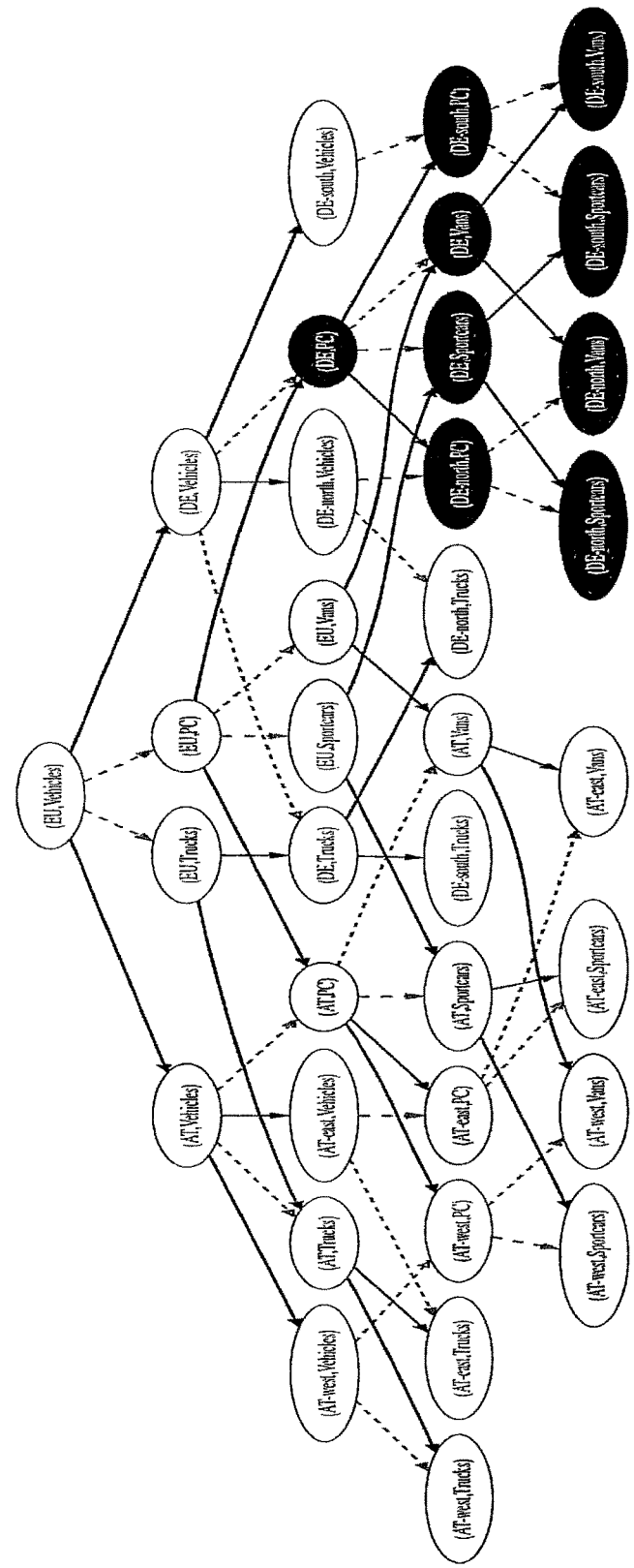
FIG. 8 is a graph representative of a product of the graphs representative of task areas of the employee in an exemplary embodiment.
Figure 9:
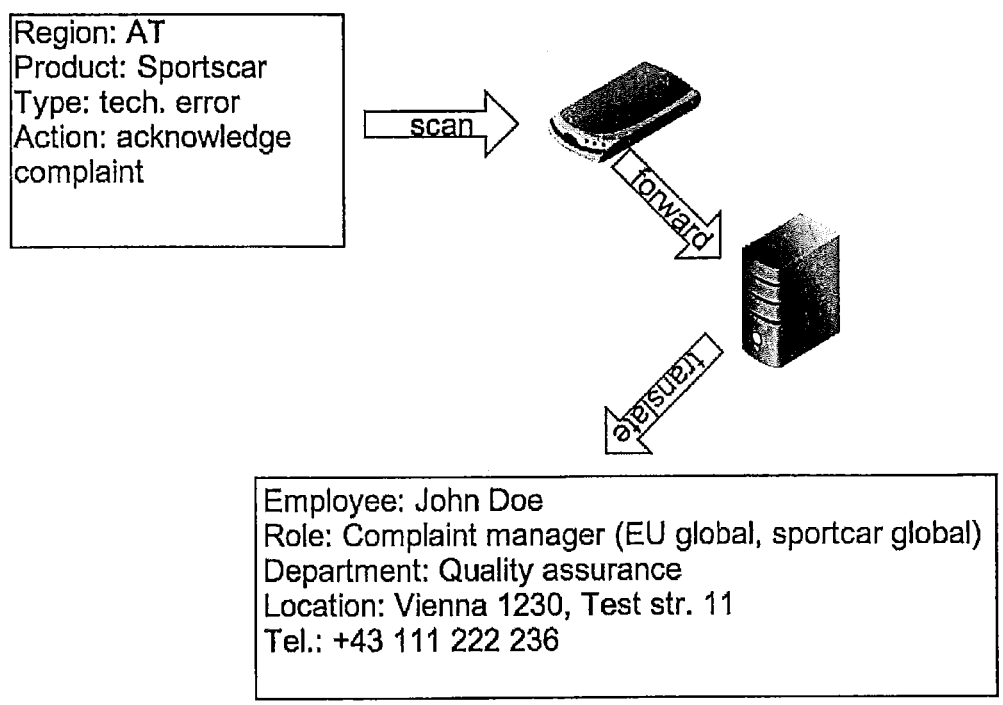
FIG. 9 is an exemplary system diagram.

In a second exemplary embodiment, the task area of an employee is defined by $(DE_{global}, PC_{global})$. This is illustrated in FIGS. 6 and 7. The product graph is illustrated in FIG. 8. The task area of the employee that is identified by a bold border can be determined in accordance with the above-described model as follows.

B={
(DE,PC)
(DE,Van)
(DE,Sportcar)
(DE-South,PC)
(DE-North,PC)
(DE-South,Van)
(DE-South,Sportcar)
(DE-North,Van)
(DE-North,Sportcar)}.

Starting at the node (DE,PC), edges drawn with broken lines, as well as edges drawn with continuous lines, were tracked in this case and all subnodes that can be reached along these edges were assigned to the task area.

A third exemplary embodiment concerns the instance of a customer service activity (complaint). The incoming request is assigned to a responsible user by scanning the complaint and selecting the authorization categories (product and region).

A user, to whom the tasks of a complaint manager ($EU_{global}$, $Sportcars_{global}$) are assigned, is automatically selected for all complaints that concern the product "sportcars" and are received from all regions within the European Union.

At the same time, a user with the task area of a complaint manager ($EU_{global}$, $Vehicles_{delegable}$) is automatically selected for all complaints that are received from all regions within the European region and concern all vehicles except the product "sportcars" that forms part of the task area of the above-described complaint manager.

If a new subdivision of the area "sportcars" and/or the regions is introduced, no additional administrative effort is required for the assignment of the new task area.

It is furthermore possible to incorporate an additional authorization category (e.g. "type of complaint") and to integrate this additional authorization category into the task area of the above-described complaint managers. For example, the task area of a complaint manager may be ($EU_{global}$, $Vehicles_{delegable}$, $Technical\_Defect_{global}$).

We claim:

1. An automated computer-assisted method for assigning work tasks to users in a workflow management system, comprising the steps of:
    providing with a computing device at least one first directed graph and at least one second directed graph that respectively comprise objects and connections between these objects, wherein objects, the connections of which originate directly or indirectly from a parent object, form sub-objects of the parent object;
    providing with the computing device at least two different authorization categories, wherein a first authorization category represents a local authorization that is limited to a respective object and a second authorization category represents an authorization that applies to the respective object and at least part of any sub-objects of the respective object, and wherein utilizing the at least two different authorization categories in conjunction with the at least one first directed graph and the at least one second directed graph results in a reduced allocation of computer memory needed for storing a plurality of authorizations with respect to a user;
    receiving an assignment at the computer device from a provided user interface, with respect to a user, of at least one of the first and second authorization categories to at least one object in the first graph and to at least one object in the second graph in order to respectively obtain assigned objects in the first and the second graphs;
    automatically forming a Cartesian product of the first and the second graph with the computing device in order to obtain a product graph;
    automatically identifying, with the computing device, a product object of the product graph resulting from the assigned object of the first graph and the assigned object of the second graph and identifying, with the computing device, sub-objects of the product object, to which the second authorization category also applies, if applicable;
    automatically assigning, with the computing device, the user to the identified product object and the identified sub-objects of the product graph;
    obtaining from a provided user interface, with the computing device, a responsibility request with respect to a requested object of the product graph;
    automatically determining, with the computing device, that the requested object is assigned to the user; and
    automatically assigning, with the computing device, the request to the user in response to determining that the requested object is assigned to the user.

2. The method according to claim 1, wherein the second authorization category represents an authorization that applies to the respective object and any sub-objects of the respective object.

3. The method according to claim 1, wherein the product graph features connections between objects that correspond to the structure of the first graph and connections that correspond to the structure of the second graph, and that the identification of sub-objects of the product object comprises:
    the selection of connections that originate directly and/or indirectly from the product object and have the structure of the first graph in response to determining that the second authorization category is assigned to the assigned object of the first graph;
    the selection of connections that originate directly and/or indirectly from the product object and have the structure of the second graph in response to determining that the second authorization category is assigned to the assigned object of the second graph; and
    the tracking of the selected connections, wherein all sub-objects are identified that can be reached from the product object along the selected connections.

4. The method according to claim 1, further comprising a third authorization category that represents an authorization applying to the respective object and those sub-objects of the respective object, to which no authorization of the first or second authorization category of another user is assigned.

5. The method according to claim 4, wherein the identification of sub-objects of the product object comprises:
    the selection of connections that originate directly and/or indirectly from the product object and have the structure of the first graph in response to determining that the third authorization category is assigned to the assigned object of the first graph;
    the selection of connections that originate directly or indirectly from the product object and have the structure of the second graph in response to determining that the third authorization category is assigned to the assigned object of the second graph; and
    the tracking of the selected connections, wherein all sub-objects are identified that can be reached from the product object along the selected connections and to which no authorization of the first or second authorization category of another user is assigned.

6. The method according to claim 1, wherein at least one additional graph is provided that comprises objects and connections between these objects.

7. A data processing program that is executed in a data processing system and comprises software code elements for carrying out the method according to claim 1.

8. A computer program product that is stored on a computer-compatible medium and contains computer-readable program means in order to prompt a computer to carry out the method according to claim 1.

* * * * *